July 18, 1933.  J. C. WELLS  1,918,998
LENS STRAP
Filed Aug. 8, 1929
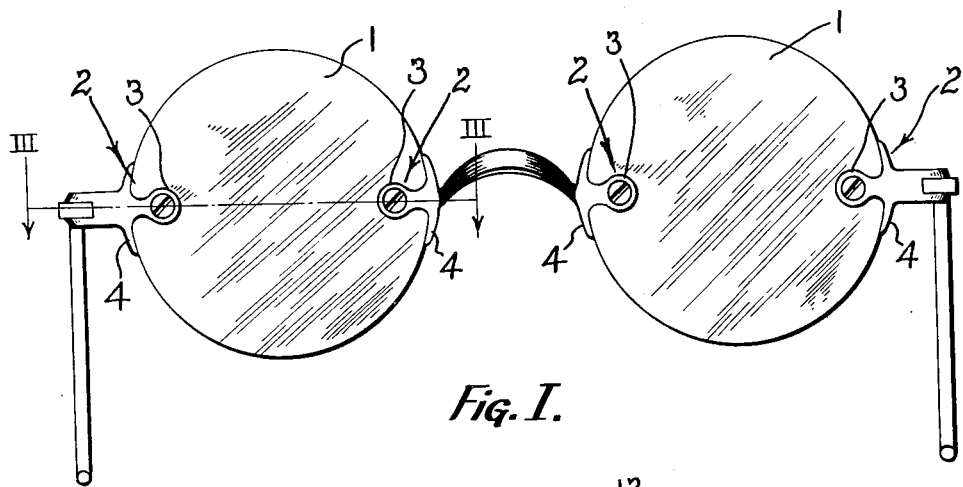
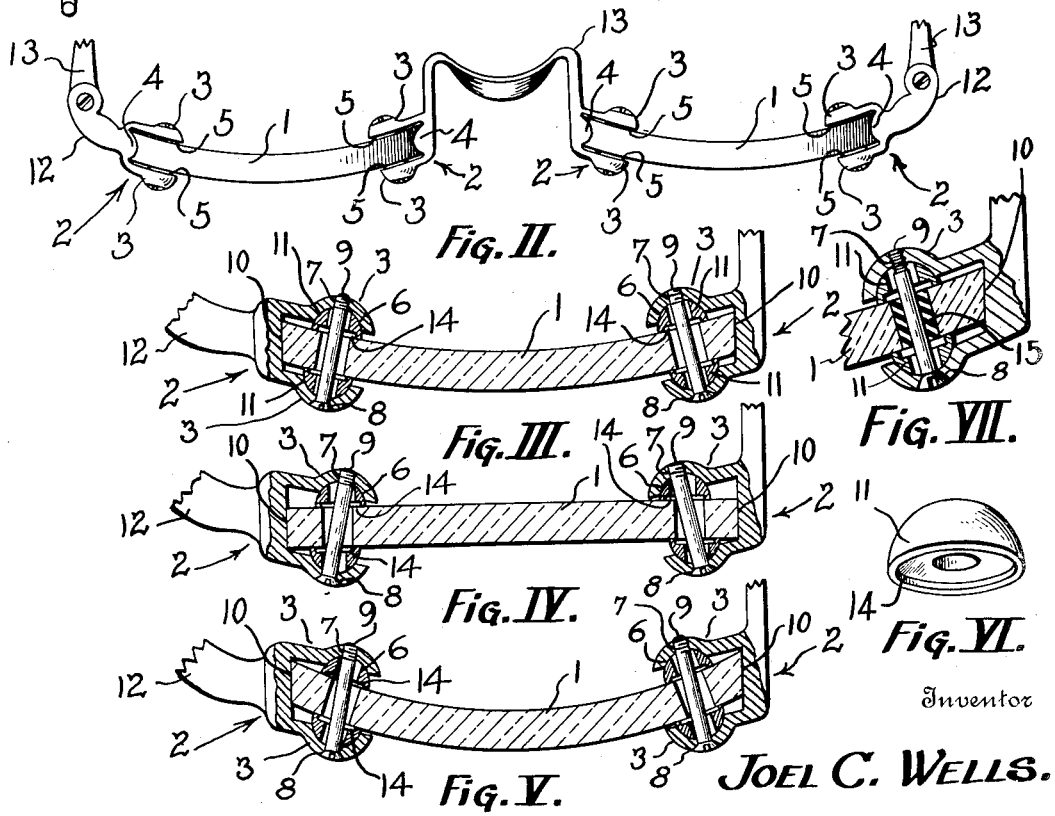
Inventor
JOEL C. WELLS.
By Harry H. Styll
Attorney Patented July 18, 1933

1,918,998

UNITED STATES PATENT OFFICE

JOEL C. WELLS, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS

LENS STRAP

Application filed August 8, 1929. Serial No. 384,252.

This invention relates to improvements in ophthalmic mountings and has particular reference to means for supporting a pair of lenses before the eyes of the wearer.

The principal object of this invention is to provide lens holding means which will firmly clamp the lenses but have no tendency to break them.

Another object of this invention is to provide lens holding means which will be adaptable without alteration to most types of ophthalmic lenses.

Another object of this invention is to provide bearing contact for the lens holding means in rimless mountings which will be situated away from the weakest points.

Another object of this invention is to eliminate the twisting action of the holding screws in a rimless mounting and the consequent damage to parts.

Another object of this invention is to provide means in a rimless mounting to absorb the shocks from accidental blows and such, thus protecting the lenses.

Other objects and advantages will become apparent from the following description taken in connection with the accompanying drawing and it will be apparent that many changes may be made in the details of construction and arrangement of parts without departing from the spirit of the invention as expressed in the accompanying claims. I, therefore, do not wish to be limited to the exact details shown and described as the preferred forms only have been shown by way of illustration.

Referring to the drawing:

Fig. I is a front view of an ophthalmic mounting embodying the invention.

Fig. II is a top or plan view of the mounting shown in Fig. I.

Fig. III is an enlarged sectional view on line III—III of Fig. I.

Fig. IV is an enlarged sectional view similar to Fig. III illustrating the invention applied to a flat lens.

Fig. V is an enlarged sectional view similar to Fig. III illustrating the invention applied to a deep curve meniscus lens.

Fig. VI is an enlarged perspective view of the semispherical washer.

Fig. VII is an enlarged sectional view of one of the clamp members showing a slight modification.

Heretofore much trouble has been caused by the holding means for the lenses in rimless ophthalmic mountings. The holding means normally consisted of a strap having a pair of ears which clamped one on each side of the lens and were held by a screw passing through a hole, the other end of the strap being adapted to carry the bridge or temple portions. The straps were a survival from the flat lens period and were quite unsuited for the present day meniscus disk shaped lenses. It will readily be seen that a strap which is quite suitable for a flat lens will necessarily need adjusting before it will fit the curved faces of a meniscus lens. In the bending of the strap to fit the curved faces the screw holes were pulled out of line with one another, as will be readily seen. The strap, when placed on the lens in this poor condition, often caused breakage as soon as the screw was tightened for the holes naturally tended to straighten themselves into alignment with one another.

It will also be apparent that it would be extremely difficult and expensive to manufacture a strap having curved faces to fit each different lens curvature and most manufacturers therefore continue to use the flat lens strap with all its disadvantages. It is the prime object of my invention to overcome the disadvantages associated with the flat strap and provide a novel construction particularly adaptable to the present day shapes of lenses. The invention is directed towards the provision of such a strap and also to incorporate other improved features whose novelty will be readily apparent from the following description.

Referring to the drawing in which similar characters of reference indicate coresponding parts throughout, the numeral 1 denotes the lenses of an opthalmic mounting to which are attached the straps 2 which form the basis of the invention. The numeral 2 is used to designate the straps of both bridge and temporal attachments. Although a slightly different construction is necessary at the ends of these two attachments to accommodate temples and bridge, the end embodying the invention remains unchanged as will readily be seen from the drawing.

I preferably make the improved strap 2 from a single piece of material, such as precious or filled metal sheet, by blanking or otherwise forming the shape in flat form. The strap 2 has ears 3 and brace members 4 which are formed by the blanking process and lie in one plane. I can also form ball sockets 6 in the ears 3 while blanking the strap from the sheet if so desired. I next preferably pierce the ball sockets 6 by drilling or other means and form a screw thread 7 in one hole and a countersink 8 in the other. The strap is now ready to be bent to the shape shown in the drawing and the two ears 3 are then bent to such shape. It will be observed that clearance 5 is left between the faces of the ears 3 and the lens 1 and that these faces are at an angle to the edge 10 of the lens 1 and the inner face of the strap 2, which contacts therewith. In bending the strap 2 to the specific form described I have devised a means whereby one form of strap will fit the majority of lens curvatures.

If a flat lens, Fig. IV, having a radius of infinity is considered at one end of the scale and a deep curve meniscus, Fig. V, with a radius of twenty-six millimeters at the other the majority of lens curvatures will be included in this scale. I, therefore, choose a median curve such as shown in Fig. III and form the angle of my strap 2 to conform thereto. It will be seen that enough adjustment is provided to allow the strap to fit either a flat lens, Fig. IV, or one of deep curvature, Fig. V, without alteration.

I next form a substantially semi-spherical washer 11 of either metallic or non-metallic material such as composition or filler which fits in the ball socket 6. A clearance hole is provided in the washer 11 to allow the screw 9 freedom of position. The washer 11 is also formed with a recess 14 to keep the outer edges lower than the central portion. A larger clearance hole is next provided in the lens 1 as shown in Figs. III, IV and V. The diameter of the washer 11 itself is larger than the diameter of the hole in the lens 1 and it will contact on a small area surrounding the hole in the lens 1, by reason of the recess 14 thus avoiding the weak portion of the lens 1 surrounding the hole. The screw 9 will be able to take up any position across the hole in the lens 1 according to the curvature of the lens itself, but will not tend to break the lens as will be readily seen. The curvature of the lens 1, therefore, sets the angle the strap 2 will position itself at and the screw 9 can freely take up any position thus set by the position of the holes in the strap 2.

The temple joints 12 and bridge 13 are attached by solder or other suitable means to the straps 2 to form a complete mounting in the usual way. I next insert the washers 11 and assemble the strap on the lens by means of the screw 9.

In the operation of the device the inner face of the strap contacts with the edge 10 of the lens and thus keeps the strap in similar position for all types of lenses as clearly shown in Figs. III, IV and V. No other portion of the strap, however, touches the lenses as the washer 11 supports the strap 2 and keeps it away from the lens except at the point named. The temples and nose bridge are thus in exactly the same position on a flat lens as they are on a deeply curved meniscus one, as shown in Figs. III, IV and V. The washer 11 is always in contact with the face of the lens 1 and allows the strap to rock and adjust itself on the semi-spherical contour. The clearance holes in the lens 1 and washer 11 provide ample allowance for this positioning to take effect. The simplicity of the operation and the ease of assembly without fear of breaking the lenses is obvious from the foregoing. A single size of strap will be adaptable for the majority of ophthalmic lenses as the different curvatures are compensated for by the rocking effect on the seat. The small surface operated upon by the washer also eliminates twisting when the screw is tightened, thereby avoiding damage to the lenses and the screw holes are always in line with one another.

In Fig. VII there is shown a slight modification wherein a tubular member 15 of resilient material such as rubber or the like is employed in combination with the universal clamps 11 to act as a filler for the opening in the lens to aid in holding the lens resiliently in position within the strap. It is apparent that the resilient tube will permit the strap to adjust itself to any shape lens and also tend to resiliently hold the edge 10 of the lens in constant engagement with the inner face of the strap. A plastic cement or the like may also be used instead of the resilient tube, particularly in cases where a permanent connection is required. This may be accomplished by placing plastic cement or the like in the opening in the lens and thence drawing the clamps together by tightening the screw 9 as has been previously described. The cement or the like is then allowed to harden to permanently fix the connection.

From the foregoing it will be seen that I have provided means to carry out all the objects of the invention in a simple, economical and efficient manner, especially in providing means to allow a rimless lens to be held firmly whatever its curvature without fear of breakage.

Having described my invention, I claim:

1. A clamping device for clamping a lens having an opening therethrough, comprising a pair of spaced clamping arms having aligned openings therethrough alignable with the opening in the lens, a securing member passing through the opening in the arms and adapted to pass through the opening in the lens, separate movable bearing members each having an opening through which the securing means passes and each adapted to lie between its adjacent arm and the lens, the openings in said bearing members and in said lens being larger than the cross section of the securing member, so that said bearing members can be moved to adjust themselves in compact clamping engagement to changes in angular relationship between the arm and lens.

2. A clamping device for clamping a lens having an opening therethrough, comprising a clamping arm having an opening alignable with the opening in the lens, a securing member extending transversely from the opening in the clamping arm and adapted to pass through the opening in the lens, and a separate movable bearing member having an opening and adapted to lie between the arm and the lens with the securing member passing therethrough, the opening in the lens and the bearing member being larger than the cross section of the securing member, whereby the lens and the bearing member may have a relatively angular adjustment with respect to the arm so that different angular relationships between the arm and lens may be accommodated.

3. A clamping device for clamping a lens having an opening therethrough, comprising a clamping arm having an opening alignable with the opening in the lens, a securing member extending transversely from the opening in the clamping arm and adapted to pass through the opening in the lens and a separate movable bearing member having an opening and a rounded surface contacting with said clamping arm and adapted to lie between the arm and the lens with the securing member passing therethrough, the opening in the lens and the bearing member being larger than the cross section of the securing member, whereby the lens and the bearing member may have a relatively angular adjustment with respect to the arm so that the different angular relationships between the arm and lens may be accommodated.

4. A clamping device for clamping a lens having an opening therethrough, comprising a clamping arm having an opening alignable with the opening in the lens, a securing member extending transversely from the opening in the clamping arm and adapted to pass through the opening in the lens and a separate movable bearing member having an opening and a rounded surface contacting with said clamping arm and adapted to lie between the arm and the lens with the securing member passing therethrough, the opening in the lens and the bearing member being larger than the cross section of the securing member, whereby the lens and the bearing member may have a relatively angular adjustment with respect to the arm so that the different angular relationships between the arm and the lens may be accommodated, and a filler member in the opening in the lens through which the securing member extends.

JOEL C. WELLS.